United States Patent
Silva (10) Patent No.: US 9,749,784 B1
(45) Date of Patent: Aug. 29, 2017

(54) RADIOFREQUENCY IDENTIFICATION AND LOCATION SYSTEM

(71) Applicant: Octavio Cesar Silva, Melbourne, FL (US)

(72) Inventor: Octavio Cesar Silva, Melbourne, FL (US)

(*) Notice: Subject to any disclaimer, the term of this patent is extended or adjusted under 35 U.S.C. 154(b) by 108 days.

(21) Appl. No.: 15/011,658

(22) Filed: Jan. 31, 2016

Related U.S. Application Data (60) Provisional application No. 62/139,780, filed on Mar. 29, 2015.

(51) Int. Cl.
| | |
|---|---|
| *H04W 24/00* | (2009.01) |
| *H04W 4/02* | (2009.01) |
| *H04W 64/00* | (2009.01) |
| *H04L 5/00* | (2006.01) |

(52) U.S. Cl.
CPC ............ *H04W 4/02* (2013.01); *H04L 5/0007* (2013.01); *H04W 64/00* (2013.01)

(58) Field of Classification Search
CPC ........ H04W 4/02; H04W 64/00; H04L 5/0007
See application file for complete search history.

(56) References Cited

U.S. PATENT DOCUMENTS

| | | | | |
|---|---|---|---|---|
| 2013/0148632 | A1* | 6/2013 | Gogic | H04W 36/0083 370/331 |
| 2016/0018508 | A1* | 1/2016 | Chen | G01S 5/0252 455/456.1 |
| 2016/0234684 | A1* | 8/2016 | Hekstra | H04K 1/02 |

* cited by examiner

*Primary Examiner* — Wayne Cai (57) ABSTRACT

The Radiofrequency Identification and Location System represents a novel system and method for locating a Remote Transceiver by means of a Tracking Transceiver whereby the Tracking Transceiver transmits its identification (ID) to the Remote Transceiver which responds with its own ID. The IDs consist of unique PN code sequences which alternately can be PN cover codes and orthogonal codes. A Remote Transceiver can respond to multiple Tracking Transceivers simultaneously while a Tracking Transceiver can receive from multiple Remote Transceivers. By measuring the transit time of its transmitted PN code with respect to the PN code received from a Remote Transceiver, the Tracking Transceiver can measure the distance to that Remote Transceiver and home in gradually.

8 Claims, 9 Drawing Sheets

RADIOFREQUENCY IDENTIFICATION AND LOCATION SYSTEM

CROSS REFERENCE TO RELATED APPLICATIONS

This is a non-provisional patent submittal corresponding to provisional patent application No. 62/139,780 Radiofrequency Identification and Location System, submitted on Mar. 9, 2015.

STATEMENT REGARDING FEDERALLY SPONSORED RESEARCH OR DEVELOPMENT

Not applicable.

REFERENCE TO SEQUENCE LISTING, A TABLE, OR A COMPUTER PROGRAM LISTING COMPACT DISC APPENDIX

Not Applicable.

BACKGROUND OF THE INVENTION

The present invention relates generally to radiofrequency devices and more specifically to a radiofrequency identification and location system capable of locating and identifying remote objects with embedded radiofrequency (RF) transceiving functions with the aid of a Tracking Transceiver.

Current autonomous RF tracking technology is based on the received signal strength indicator (RSSI) method where the master tracker receives the signal strength from the tracked object and homes in to it as the RSSI increases. The RSSI is affected by many factors such as attenuation by intervening objects, foliage for example, that make the RSSI to vary too much to provide an accurate measurement of the distance. Other factors include the Tracking Transceiver antenna patterns that may make that signal to vary by at least 1 dB resulting in the same distance inaccuracies. The system described herein is based on the transmission of signal pairs where the Tracking Transceiver sends a pseudorandom noise (PN) coded signal and the Remote Transceiver responds with a similar signal assigned to the Tracking Transceiver. The Tracking Transceiver in turn measures the delay of the signal pair to get an accurate measurement of the Remote Transceiver distance as well as its identity.

BRIEF SUMMARY OF THE INVENTION

The Radiofrequency Identification and Location System represents a novel system and method for locating a Remote Transceiver by means of a Tracking Transceiver whereby the Tracking Transceiver transmits its identification (ID) to the Remote Transceiver which responds with its own ID. The IDs consist of unique PN code sequences. A Remote Transceiver can respond to multiple Tracking Transceivers simultaneously. Likewise, a Tracking Transceiver can receive from multiple Remote Transceivers. By measuring the delay of its transmitted PN code with respect to the PN code received from a Remote Transceiver, the Tracking Transceiver can measure the distance to any Remote Transceiver.

DETAILED DESCRIPTION OF THE INVENTION

Figure 1:
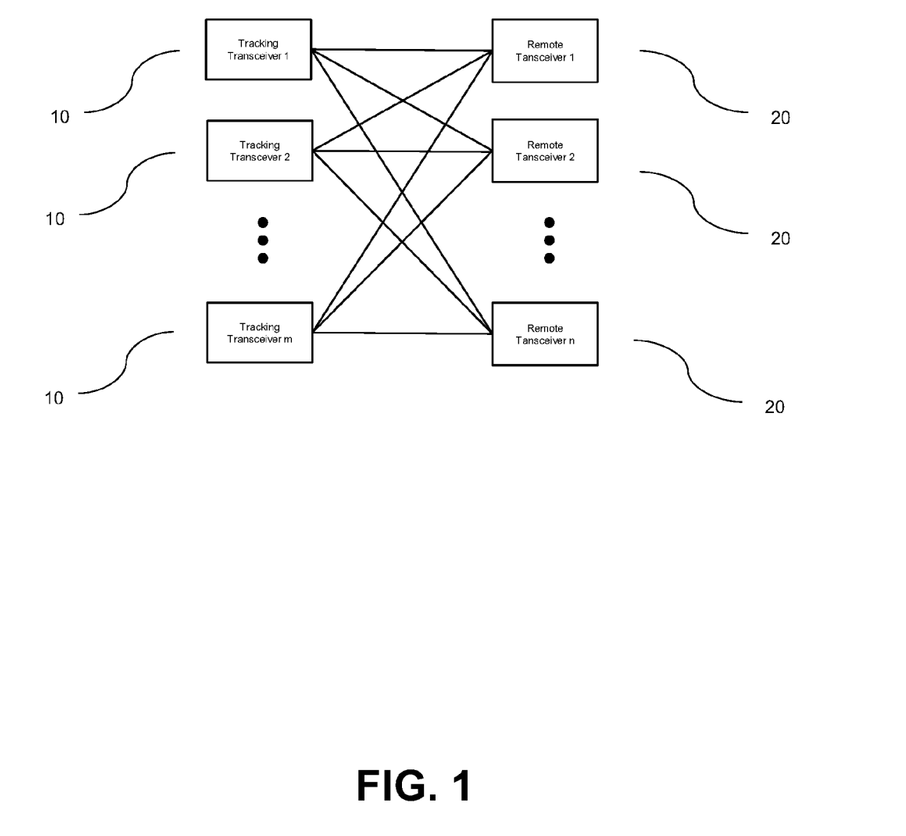
FIG. 1 shows the transmission connections between Tracking Transceivers and Remote Transceivers.
Figure 2:
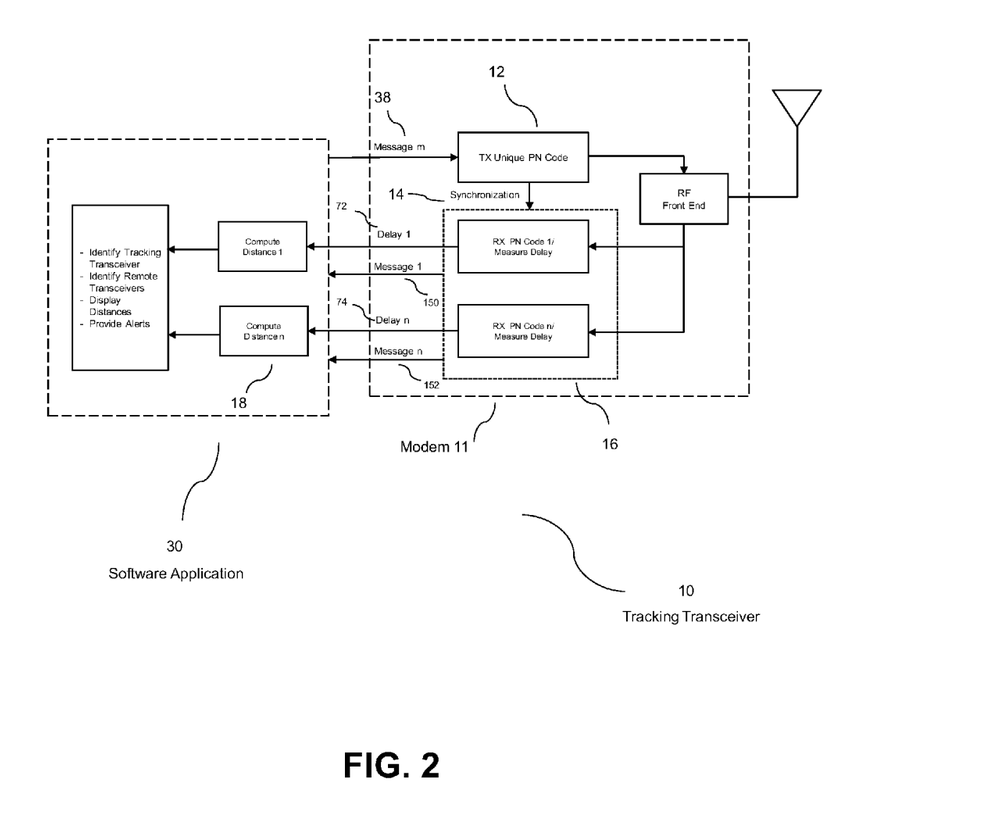
FIG. 2 shows the overall architecture of the Tracking Transceiver and Software Application.
Figure 3:
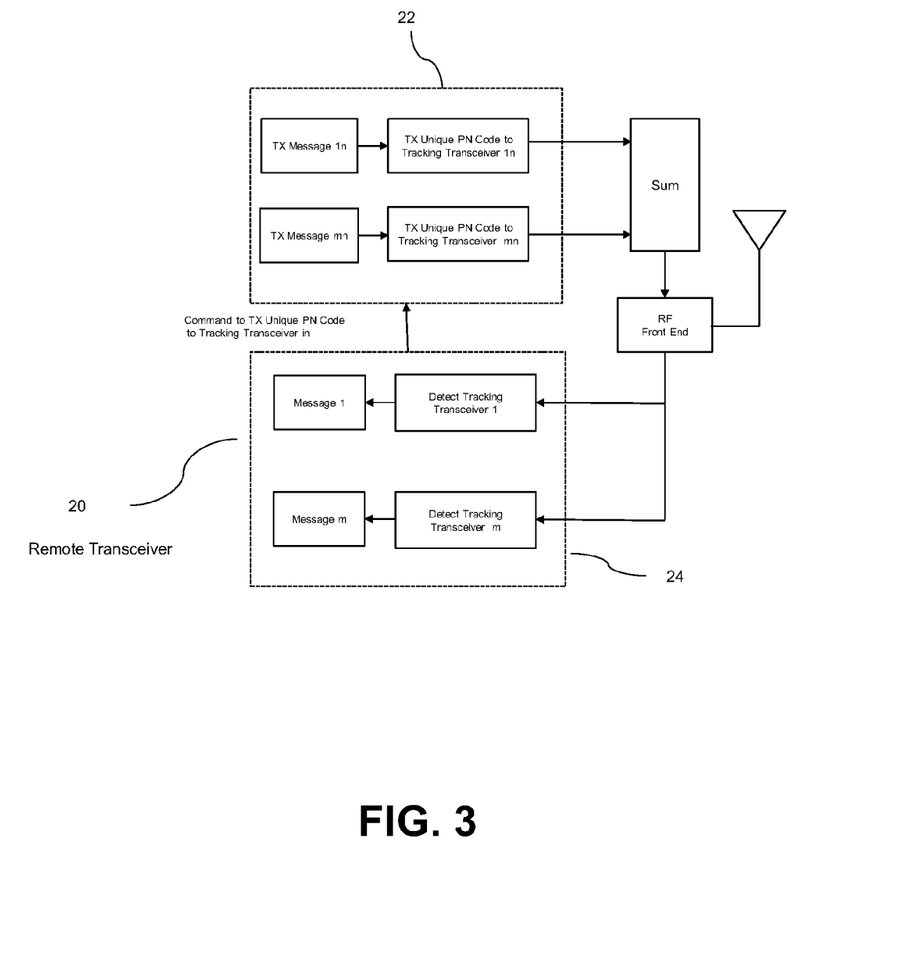
FIG. 3 shows the overall architecture of the Remote Transceiver.

As shown in FIGS. 1, 2 and 3, the Radiofrequency Identification and Location System consists of a plurality of Tracking Transceivers 10 and a plurality of Remote Transceivers 20. A Tracking Transceiver is comprised of a Modem 11 and a Software Application 30. A Tracking Transceiver broadcasts to all Remote Transceivers while a Remote Transceiver can transmit to any Tracking Transceiver individually as shown in FIG. 1. A Tracking Transceiver 10 transmits its ID as a unique PN code 12 to a plurality of Remote Transceivers 20. Once a Remote Transceiver receives the Tracking Transceiver unique ID in the Modem 11 receiver bank 24, it transmits to that Tracking Transceiver a unique PN code through the Modem 11 transmitter bank 22. The Remote Transceiver 20 incorporates a set of unique PN codes whereby a unique PN code is transmitted to a specific Tracking Transceiver 10.

Similar technology is used in the commercial Code Division Multiple Access (CDMA) cellular phone systems in which the base station transmits a PN cover code to a cellular phone. The cellular phone transmissions are identified by the base station by its unique PN code sequence in the CDMA operation.

The Tracking Transceiver synchronizes 14 the transmission of its ID 12 with the reception of a Remote Transceiver PN code in its Modem 11 receiver bank 16. The Tracking Transceiver 10 receives a selected Remote Transceiver's PN code and measures the delay in its Modem 11 receiver bank 16. A software application 30 consequently computes the distance 18 to that Remote Transceiver so that the Tracking Transceiver can gradually home in to that selected Remote Transceiver.

Figure 4:
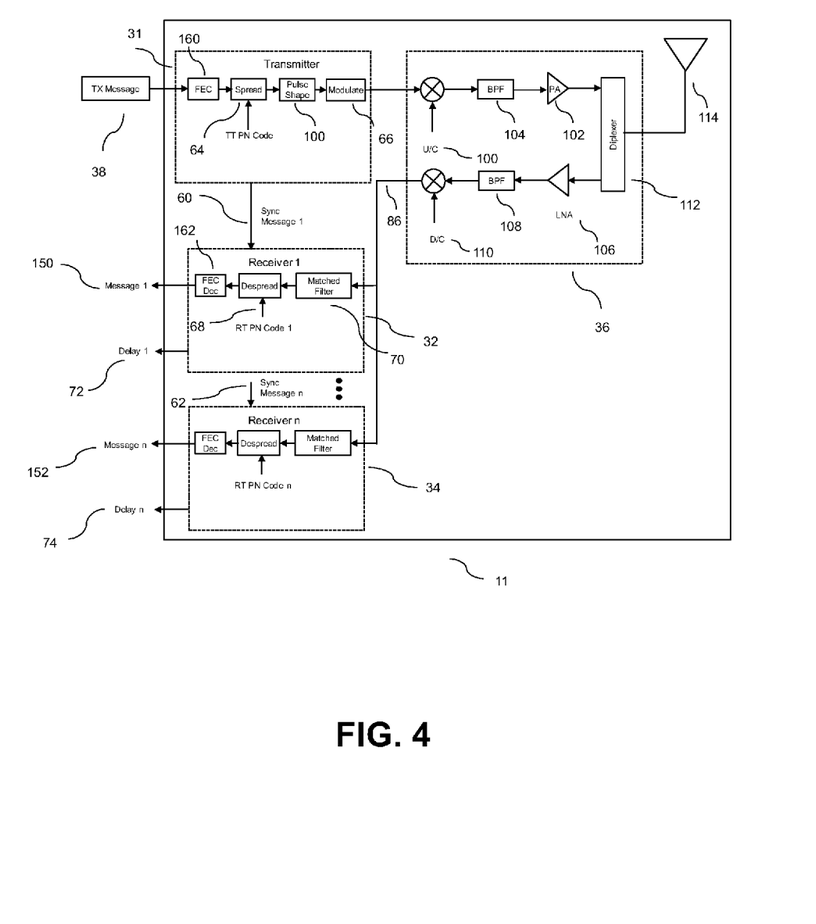
FIG. 4 shows the building blocks for the PN Code Tracking Receiver.

The Modem 11 transmitter 31 consists of a PN code sequence, TT PN Code 64, which is pulse shaped by a filter 100 and BPSK modulated 66 as shown in FIG. 4. Alternately, an arbitrary message 38 can be spread first and the resulting signal pulse-shaped and BPSK-modulated. In another embodiment, the modulation and spreading functions can be reversed. The resulting spread signal enters the RF front end 36 where upconversion 100, amplification 102 and filtering 104 is performed as well a duplexing 112 with the received signal to provide a single interface to the antenna 114. On the receive side, the Modem 11 is composed of n receivers 32 and 34 where each receiver match-filter demodulates, 70 for Receiver 1, and depsreads with a PN Code, RT PN Code 1, 68 for Receiver 1, the aggregate received signal 86 with the unique PN code assigned by the Remote Transceiver to this Tracking receiver. Once a Remote Transceiver is detected in each receiver 32 and 34, the delay 72 and 74 is measured with respect to synchronization message 60 and 62 to determine the actual delay of the round trip transmissions once the fixed delays are factored out. The RF front end 36 of the receive side performs duplexing 112, low noise amplification 106, filtering 108 and downconversion 110 before sending the aggregate signal 86 to each receiver 32 and 34. Alternately, if the Remote Transceiver is configured to insert an arbitrary message 150 and 152. That message 150 and 152 is sent to the software application 30 for further processing. Messages can include status such as power levels or number of simultaneous Tracking Transceivers operating in that Remote Transceiver.

The Tracking Transceiver 10 Modem 11 can also optionally incorporate forward error correction coding (FEC) 160 when sending messages which can lower the power amplifier rating or increase the distance of detection. Likewise, The Tracking Transceiver 10 Modem 11 can optionally FEC decode 162 transmissions from a Remote Transceiver 20.

Figure 5:
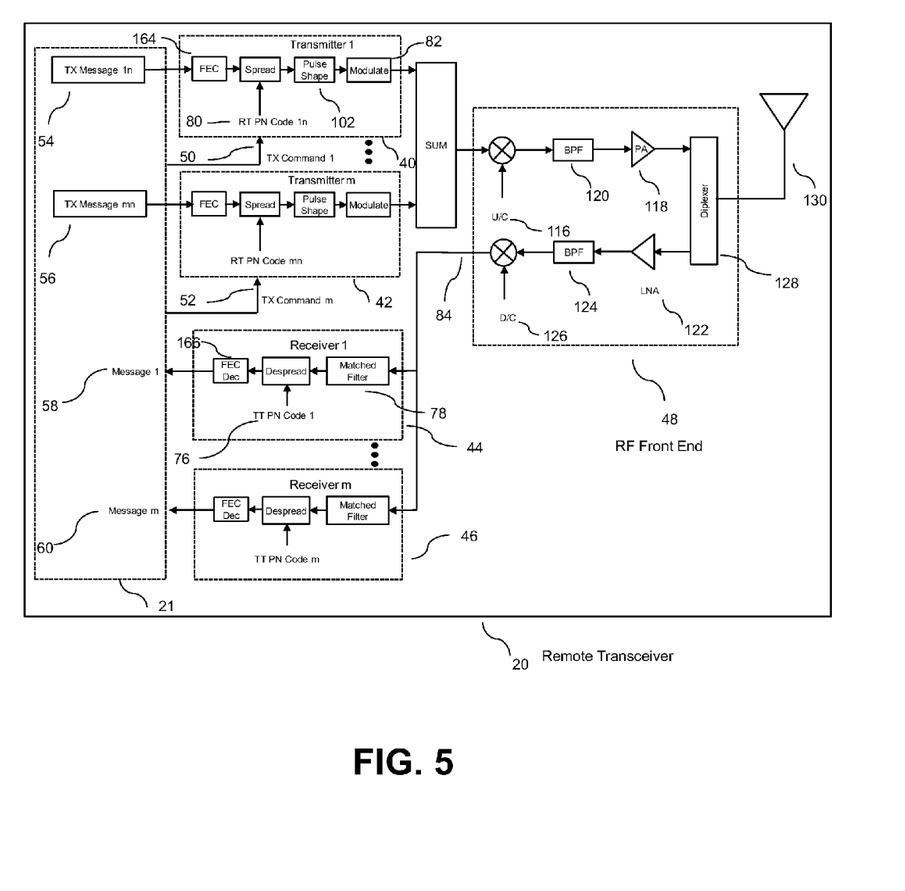
FIG. 5 shows the building blocks for the PN Code Remote Receiver.

As shown in FIG. 5, on the receive side, the Remote Transceiver 20 is composed of m receivers 44 and 46 where each receiver demodulates with a matched filter, 78 for Receiver 1, and despreads with the unique PN code, TT PN Code 1, 76 for Receiver 1, the aggregate received signal 84. In another embodiment, the modulation and spreading functions can be reversed. One receiver is assigned to one Tracking Transceiver. Once a Tracking Transceiver 20 is detected a command 50 and 52 is given from the Software Application 21 to transmit a unique PN code, RT PN Code 1n, 80 for Receiver 1, to that specific Tracking Transceiver. Each of the m receivers despreads and demodulates the aggregate received signal 84 as shown in FIG. 5. When a message 58 and 60 is optionally transmitted by the Tracking Transceiver, that message 58 and 60 is further processed in the Software Application 21. Messages can be control commands to reduce power levels or to go to stand-by mode. Each of the m transmitters 42 and 44 performs spreading with the unique PN code sequence, RT PN Code 1n, 80 for Transmitter 1, pulse-shapes with a filter 102, and BPSK-modulates 82. One Transmitter is assigned to one Tracking Transceiver 10. Thus, Transmitter 1 40 is assigned to Tracking Transceiver 1 and Transmitter m 42 is assigned to Tracking Transceiver m. Optionally, a message 54 and 56 from the Software Application 21 can be first BPSK-modulated and spread with the unique PN code sequence, RT PN Code 1n, 80 for Transmitter 1. On the transmit side, the RF front end 48 performs upconversion 116, amplification 118 and filtering 120 as well a duplexing 128 with the received signal to provide a single interface to the antenna 130. The RF front end 48 on the receive side performs duplexing 128, low noise amplification 122, filtering 124, and downconversion 126 before sending the aggregate signal 84 to each receiver 44 and 46.

The Remote Transceiver can also optionally incorporate FEC 164 when sending messages which can lower the power amplifier rating or increase the distance of detection. Likewise, The Remote Transceiver 20 can optionally FEC decode 166 transmissions from a Tracking Transceiver 10.

The distance between the Tracking Transceiver and the Remote Transceiver is computed by measuring the delay 72 and 74 or transit time. This is accomplished by sending a synchronization message 60 and 62 from the Modem Transmitter 31 to any of the Tracking Modem Receivers 32 and 34. When a signal is detected at any of the Receivers 32 and 34 by any transmission from a Remote Transceiver 20, that Receiver 32 or 34 records that event. Thus, the two time events are used to compute the total transit time and the one-way transit time from the Remote Receiver 20 to the Tracking Transceiver 10 once all fixed delays are factored out. Time information is obtained from timing sources such as crystal oscillators. Also, if the Tracking Transceiver 10 is connected to a mobile device, this device can provide the timing information from local sources or GPS. The one-way transit time is sent to the software application 30 which computes the distance or range.

The Tracking Transceiver Modem 11 implements bi-phase shift keying (BPSK) modulation and PN coding which provide enough robustness to mitigate the effects of the communications channel. In some cases, the link between the Tracking Transceiver and the Remote Transceiver can be modeled as a Rayleigh channel. This type of environment can be encountered in cities as in cellular systems where the RF signals travel from source and destination through path where several buildings are present. Similar cases are encountered indoors where the RF signals encounter objects in their transmission path such as an office setting that have cubicle walls, office rooms, desks and the like. PN codes as in CDMA cellular systems can provide enough robustness to mitigate the effects of multi-path fading in Rayleigh channels. The Tracking Transceiver implements a Rake receiver to provide enough margin for this type of fading. The effects of multi-path in CDMA communications is well known and long PN code sequences can provide enough margin to deep fades with the Rake receiver implementation. CDMA technology is mature enough and the transceiver can be implemented readily with off-the-shelf technology. This implementation is economically feasible and can provide much more simplicity with respect to other systems designs for communications in multipath fading such as Orthogonal Frequency Division Multiplexing (OFDM) systems. PN code implementation along with the Rake receiver can mitigate fades on the order 12 dB which can be adequate for most Rayleigh channel models.

Another type of communications channel can follow the Rician model where a direct line of sight path exists along with a multi-path component. This type of model can also be encountered in setting where low rise objects exist in the transmission path and when the Tracking Transceiver is close to a Remote Transceiver. In this case, the PN code model can mitigate this effect since fades can be less than those of the Rayleigh channels. In addition, in places like forests where shadowing is predominant, the channel can be modeled as log-normal.

As in the case of the Tracking Transceiver 10, a Remote Transceiver 20 implements the same type of modulation and multipath mitigation. That is, it implements BPSK modulation and the Rake receiver design, using the same type of PN code sequence. Each transmission to one Tracking Transceiver generates a BPSK-modulated PN code broadcast. Likewise, the receiving function, implements the Rake receiver to demodulate the BPSK PN codes transmission from a Tracking Transceiver to mitigate the effects of the aforementioned communication channel models.

The PN codes are selected such that the processing gain is high enough to mitigate interference from other foreign co-inhabiting systems or other systems of the same type. Typical processing gains to allow coexistence with other system can be from 20 to 30 dB. The system can be designed to operate in licensed or unlicensed spectrum regions but the selection of PN codes is such that interference to the systems operating in these regions is essentially negligible.

These processing gains also allow for small power amplifier levels while keeping link distances to practical lengths. Both transceiver types for example can operate nominally at a power level of 2 W in the 5 GHz frequency spectrum. With these power levels, distance of at least 1000 m can be achieved for a Tracking Transceiver to detect a Remote Transceiver. The system unlike other systems doesn't operate on RSSI detection but on signal transmission delays, meaning that at 1000 m, for example, fades in the intervening paths have almost no effect in the delay measurements in the Tracking Transceiver. Distances can be even larger in open spaces such as such as in the countryside. The design and small form factors of the Tracking Transceivers is practical for users to carry when finding a vehicle in a parking lot.

Given the fact that a Tracking Transceiver 10 has to detect a Remote Transceiver 20 from any angle, each Tracking Transceiver 10 or Remote Transceiver 20 is designed with an omni transmission or reception capability. That means that each type of device incorporates a low gain antenna or an array of low gain antennas to allow for a field o view of at least 180 degrees. Many inexpensive antenna designs already exist and have been incorporated in devices such as smartphones. Typical antennas can be of the patch design and at least three antennas can be incorporated in a given device. Such design can provide fields of view in excess of 180 degrees. Other inexpensive antenna designs are possible such as small form factors slot antennas, but in most cases patch radiators are more practical, easy to embed in a device and easy to manufacture in the intended RF application.

Each Remote Transceiver 20 is capable of identifying a plurality of Tracking Transceivers 10 and sends a unique ID to each one of them. This means that each Remote Transceiver 20 has a receiving correlator for each Tracking Transceiver 10 in the system. Also, each Remote Transceiver 20 has a transmitting correlator for each Tracking Transceiver 10. This transmit PN code identifies uniquely each Remote Transceiver 20. Essentially, each Remote Transceiver 20 receives a PN code transmission from a Tracking Transceiver 10 and immediately transmits to that specific Tracking Transceiver 10 using the PN code assigned for that Tracking Transceiver 10. This design is analogous to a transponding function where each transmission from a Remote Transceiver 20 inserts a small, known delay once it receives a transmission from a Tracking Transceiver 10. Once this small delay and all other constant delays are factored out, an accurate distance to a Remote Transceiver 20 can be determined. The distance is computed simply from $d=t*c$, where d is distance, t is the one-way dynamic delay and c the speed of light. The one-way dynamic delay t factors out all constant delays.

Each system incorporates a unique set of PN codes for its Tracking Transceivers 10 and Remote Transceivers 20 to mitigate interference to or from other nearby systems. A PN code sequence can be 8192 bits in length, for example. The end goal is to have a large number of systems coexist as well as to operate with foreign systems in the same frequency spectrum. PN code sequences can be implemented easily with shift registers. There are a number of off-the-shelf pseudo number generators that can be used, so the set of PN code sequences is not a limiting factor to design a large number of location and identification systems.

Alternately, the unique PN codes can be replaced by unique PN cover codes and associated unique orthogonal codes for each transceiver. Each unique PN cover code is associated with a unique orthogonal code. Using orthogonal codes allows a system to eliminate interference from other systems almost entirely. There are several orthogonal codes that can be used including Walsh codes, Gold codes and Hadamard codes.

The system can provide alerts as the Tracking Transceiver 10 gets close to the Remote Transceiver 20. These can be beeps that get closer together as the the two devices get closer or LEDs that change from green to yellow to red as the distance decreases. The Tracking Transceiver can also display in real time the distance to the Remote Transceiver.

The Tracking Transceiver 10 can be integrated in a multi-purpose device or connected to it through a standard wired or wireless interface. For example, the Tracking Transceiver can be connected to an iPhone through one of its data interfaces. When integrated with a host device, the computing processing capability can also be provided by that host device as well as the Software Application 30 that enables the system functions. Other embodiments of the system when hosted in smart devices include the use of an Area Network (AN), including a Wide Area Network (WAN) or a Personal Area Network (PAN), such as Bluetooth or ZigBee, to enable a piconet in conjunction with the Software Application 30 hosted in the smart device. A smart device, an iPhone operating in a PAN for example, can be assigned the master role as a Tracking Transceiver while the Remote Transceivers and other Tracking Transceivers can be the slave nodes. In this case, the PN code architecture would be replaced by the PAN protocol stack architecture. The Tracking Transceiver 10 transmits an identification code essentially a message to provide a secure identity. A Remote Transceiver 20 can transmit immediately by sending its own secure identification code once it receives the Tracking Transceiver 10 which would measure the one transit delay and compute the distance with the Software Application 30. The PAN architecture can also be replaced by a MANET network allowing multiple Tracking Transceivers and Remote Transceivers to operate in the same manner as that of the PN code architecture except that the transceiver modems would resemble the design of the PAN architectures with MANET transceivers and the network nodes discovery mechanisms. The PAN can also operate in any of the MAC access modes, including FDMA and TDMA, in addition to the MAC established by the PAN standard.

Figure 6:
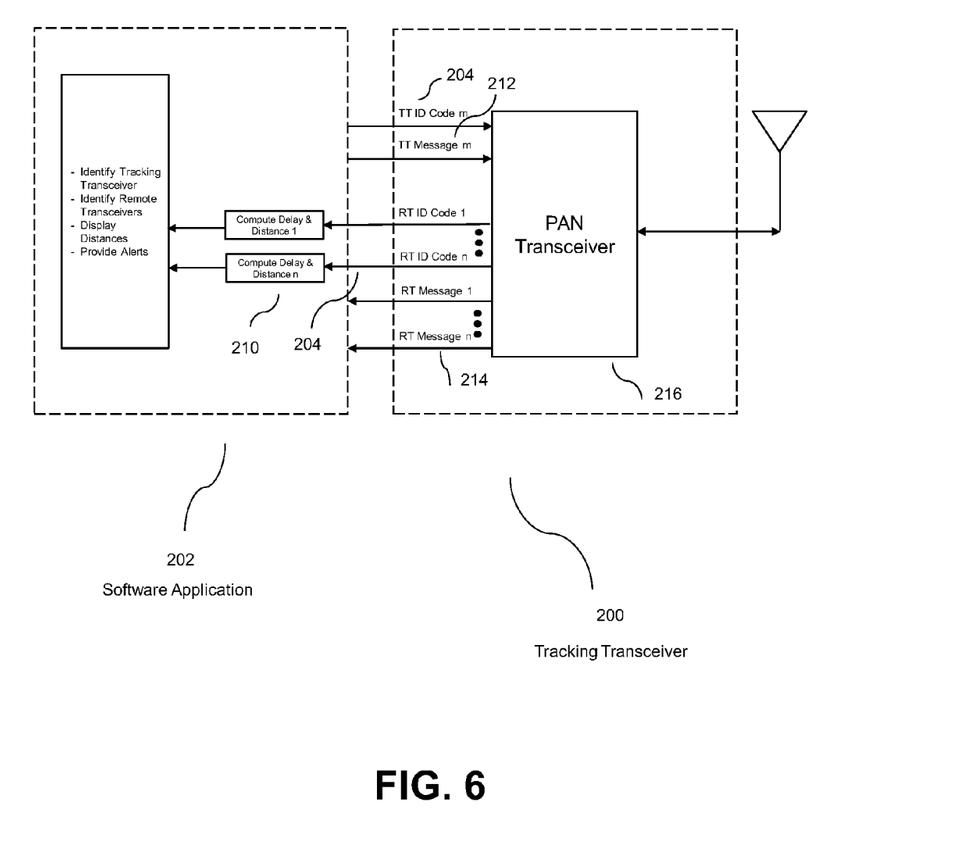
FIG. 6 shows the building blocks for the Bluetooth Tracking Receiver.

As shown in FIG. 6, for the PAN architecture, the Tracking Transceiver 200 transmits it unique ID code 204 as well as an optional arbitrary message 212 generated by the Software Application 202 by using the PAN Transceiver 216. On the receive side, the Tracking Transceiver receives via the PAN Transceiver 216 the unique ID code from any of the n Remote Transceivers, RT ID code 1 through RT ID Code n 204. The Software Application 202 computes the one-way transit delay to determine the distance 210 to any Remote Transceiver. The Software Application 202 can also receive an arbitrary message 214 from any of the Remote Transceivers.

Figure 7:
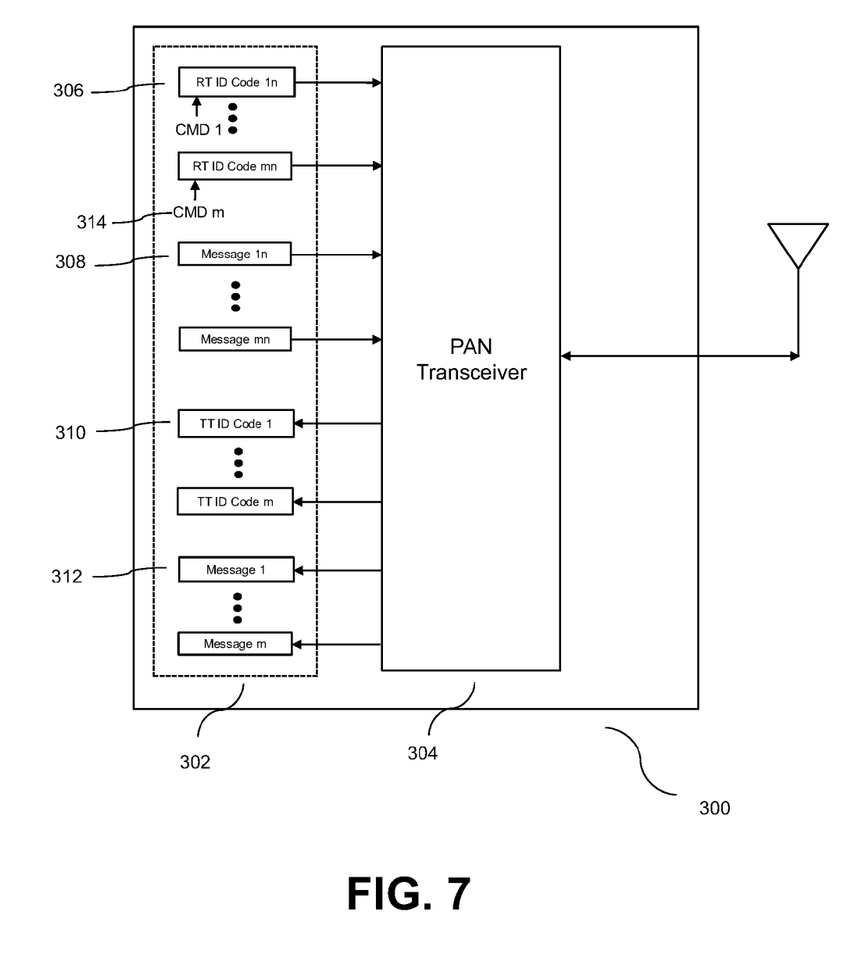
FIG. 7 shows the building blocks for the Bluetooth Remote Receiver.

For the same PAN architecture as shown in FIG. 7, the Remote Transceiver 300 receives a plurality of Tracking Transceiver ID codes 310, TT ID Code 1 through TT ID Code m, via the PAN transceiver 304. Once the Remote Transceiver receives any of those Tracking Transceiver ID codes 310 and interprets them with an application 302, it transmits immediately on command CMD m 314 a unique ID code, RT ID Code mn 306, to Tracking Transceiver m, using the functionality of the Software Application 302. Optionally, the Remote Transceiver can receive an arbitrary message 312 from any of the Tracking Transceivers as well as transmit an arbitrary message 308 to any of the Tracking Transceivers, using the Software Application 302.

In the case of a mesh network in which any Transceiver can communicate with any Transceiver, each Transceiver in the AN or MANET architecture becomes a network node and the classification of Tracking Transceiver and Remote Transceiver does not apply as each node can take the functions of the Tracking Transceiver. In this case for the PAN architecture, any node can determine the distance of any node in the piconet. Likewise, a MANET node can have visibility of any other node to determine the corresponding distance. For the case of the full mesh, the method in FIG. 9 applies which is a superset of the Tracking Transceiver and Remote Transceiver network.

Optionally, the system can determine the exact location of a remote tracker by triangulation by means of three Tracking Transceivers.

The system functions can be operated through a Software Application 30 for the PN Code architecture or Software Application 202 for the PAN architecture. Functions include displaying of a Tracking Transceiver ID, a Remote Transceiver ID, distance between Tracking Transceiver and Remote Transceiver, and alerts. The software application provides alerts as it gets closer to the Remote Transceiver by means of beeps, color code for each Remote Transceiver, LEDs and messages.

The software application can be implemented in a low end processor such as an ARM processor or hosted in a computing device as mentioned above. Implementing the system functions is not computing intensive and can be attained with around 10,000 lines of code.

Figure 8:
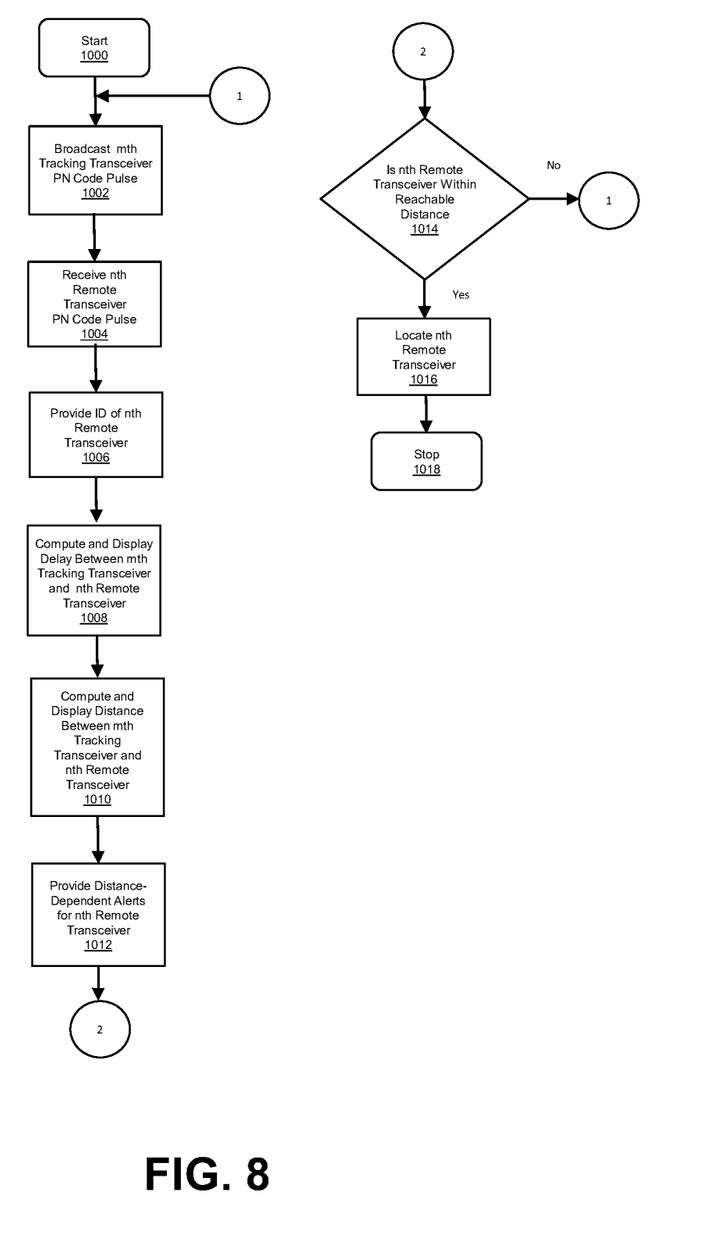
FIG. 8 shows a generalized method of the operation of the system, using PN codes.

The system main functions can be described by the generalized method flow chart shown in FIG. 8. The system is started 1000. The mth Tracking Transceiver broadcasts its PN code pulse 1002. The nth Remote Transceiver receives that PN code from the mth Tracking Transceiver 1004. The system provides the ID of the nth Remote Transceiver by virtue of its unique PN code to the mth Tracking Transceiver user 1006. The system computes and displays the delay for the mth Tracking Transceiver user from the time the mth Tracking Transceiver transmits it PN code to the reception of the nth Remote Transceiver PN code 1008. The system computes and displays the distance between the mth Tracking Transceiver and the nth Remote Transceiver for the mth Tracking Transceiver user based on the one-way transit time 1010. The system provides distance dependent alerts for the mth Tracking Transceiver user with respect to the nth Remote Transceiver 1012. The system makes a determination about whether the nth Remote Transceiver is within reachable distance of the mth Tracking Transceiver 1014. The mth Tracking Transceiver user user locates the nth Remote Transceiver and retrieves it 1016. The system has concluded locating the nth Remote Transceiver for the mth Tracking Transceiver user and stops for that specific pair 1018.

Figure 9:
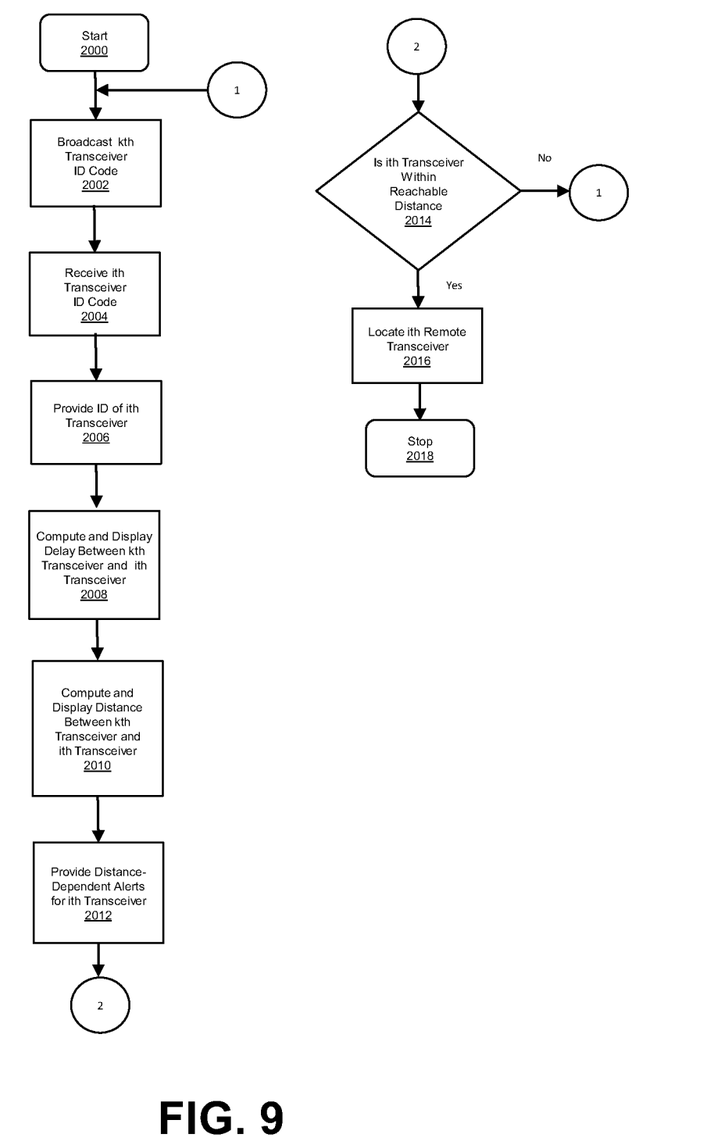
FIG. 9 shows a generalized method of the operation of the system with a Bluetooth architecture.

The system main functions can be described by the following generalized method shown in FIG. 9 when operating in a full mesh network AN or MANET architecture. The system is started 2000. The kth Transceiver broadcasts its identification code 2002. The ith Transceiver receives that identification code from the kth Transceiver 2004. The system provides the ID of the ith Transceiver by virtue of its unique identification code to the kth Transceiver user 2006. The system computes and displays the delay for the kth Transceiver user from the time the kth Transceiver transmits its ID to the reception of the ith Transceiver ID 2008. The system computes and displays the distance between the kth Transceiver and the ith Transceiver for the kth Transceiver user based on the one-way transit time 2010. The system provides distance dependent alerts for the kth Transceiver user with respect to the ith Transceiver 2012. The system makes a determination whether the ith Transceiver is within reachable distance of the kth Transceiver 2014. The kth Transceiver user locates the ith Transceiver and retrieves it 2016. The system has concluded locating the ith Transceiver for the kth Transceiver user and stops for that specific pair 2018.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention, are contemplated thereby, and are intended to be covered by the following claims.

The invention claimed is:

1. A Radiofrequency Identification and Location System for identifying and locating Remote Transceivers by means of Tracking Transceivers, comprising: a plurality of said Tracking Transceivers wherein each Tracking Transceiver is comprised of a modem and a Software Application; a plurality of said Remote Transceivers wherein each Remote Transceiver is comprised of an m-tuple of transmitters, an m-tuple of receivers and a Software Application; wherein each Tracking Transceiver broadcasts a unique pseudorandom noise (PN) code which identifies itself to a plurality of said Remote Transceivers, receives a plurality of said Remote Transceivers by decoding each PN code that identifies uniquely each Remote Transceiver, and computes the delay for each received PN code received from a Remote Transceiver with respect to the transmission of its unique PN code; wherein each Remote Transceiver receives a plurality of said Tracking Transceivers by decoding each PN code that identifies uniquely each Tracking Transceiver, transmits a unique PN code to each Tracking Transceiver immediately upon reception of said Tracking Transceiver PN code; wherein said Modem is further comprised of a transmitter that forward-error-correction encodes, PN code spreads, pulse-shapes and BPSK modulates; wherein said Modem optionally transmits an arbitrary message as an input to the forward-error-coding function; wherein said Modem is further comprised of a receiver bank incorporating an n-tuple of receivers wherein each receiver match-filters, PN code despreads and forward-error-correction decodes a signal received from a Remote Transceiver; wherein each Modem receiver optionally delivers a message from the output of the forward-error-correction decoding for further processing; wherein said Modem is further comprised of an RF front end that directly upconverts, band-pass filters and amplifies the signal transmitted by said transmitter; wherein said Modem RF front end further low-noise amplifies, band-pass filters and directly downconverts the signals received from said Remote Transceivers; wherein said Modem RF front end incorporates a diplexing function to allow the simultaneous transmission and reception of signals through the same Tracking Transceiver antenna; wherein said Remote Transceiver m-tuple of transmitters allows each transmitter independently to transmit to a Tracking Transceiver and wherein said transmitter forward-error-correction encodes, PN code spreads, pulse-shapes and BPSK modulates; wherein each Remote Transceiver transmitter optionally transmits an arbitrary message as an input to the forward-error-coding function; wherein said Remote Transceiver m-tuple of receivers allows each receiver independently to match-filter, PN code despread and forward-error-correction decode a signal received from a Tracking Transceiver; wherein each Remote Transceiver receiver optionally delivers a message from the output of the forward-error-correction decoding for further processing; wherein said Remote Transceiver is further comprised of an RF front end that directly upconverts, band-pass filters and amplifies the aggregate signal transmitted by said Remote Transceiver m-tuple of transmitters; wherein said Remote Transceiver RF front end further low-noise amplifies, band-pass filters and directly downconverts the signals received from said Tracking Transceivers; wherein said Remote Transceiver RF front end incorporates a diplexing function to allow the simultaneous transmission and reception of signals through the same Remote Transceiver antenna.

2. The Radiofrequency Identification and Location System in claim 1 wherein said Tracking Transceiver Software Application comprises a non-transitory computer-usable medium embodying computer program code, the computer program code comprising computer executable instructions to establish identification and location functions in said identification and location system wherein the instructions are executed by processing logic to: display a human machine interface (HMI) associated with a Tracking Transceiver, wherein the HMI displays the identification of each received Remote Transceiver, the delay between the associated Tracking Transceiver and each received Remote Transceiver, the distance between the associated Tracking Transceiver and each received Remote Transceiver; compute the distance to a Remote Transceiver from the one-way transit time received from the associated Tracking Transceiver; provide distance-dependent as the distance between the Tracking Transceiver and the Remote Transceiver decreases; send arbitrary messages to modify arbitrary functions or conditions of a Remote Transceiver; receive messages from a Remote Transceiver, identifying arbitrary conditions or functions; and color-code each received Remote Transceiver.

3. The Radiofrequency Identification and Location System in claim 1 wherein said Remote Transceiver Software Application is comprised of a non-transitory computer-usable medium embodying computer program, the computer program code comprising computer executable instructions to establish identification and location functions wherein the instructions are executed by processing logic to: transmit a unique PN code to each Tracking Transceiver upon receipt of said Tracking receiver PN code; send arbitrary messages identifying arbitrary functions or conditions to any tracking Transceiver; receive arbitrary messages from a Tracking Transceiver to modify arbitrarily conditions or functions.

4. A method for providing the identification and location of a plurality of Remote Transceivers by a plurality of Tracking Transceivers in a Radiofrequency Identification and Location System comprising the steps of: Starting the system; broadcasting mth Tracking Transceiver PN code pulse; receiving the PN code from the mth Tracking Transceiver at the nth Remote Transceiver; providing the ID of the nth Remote Transceiver by virtue of its unique PN code; computing and displaying the delay from the time the mth Tracking Transceiver transmits its PN code to the reception of the nth Remote Transceiver PN code in that mth Tracking Transceiver; computing and displaying the distance between the mth Tracking Transceiver and the nth Remote Transceiver based on the one-way transit time; providing distance-dependent alerts for the nth Remote Transceiver at the mth Tracking Transceiver; determining whether the nth Remote Transceiver is within reachable distance of the mth Tracking Transceiver; locating and retrieving the nth Remote Transceiver if it is within reachable distance; stopping the system for the mth Tracking Transceiver and the nth Remote Transceiver pair.

5. A Radiofrequency Identification and Location System for identifying and locating Remote Transceivers by means of Tracking Transceivers operating in an Area Network (AN) architecture, including Wide Area Network (WAN) and Personal Area Network (PAN) architectures, comprising: a plurality of said Tracking Transceivers wherein each Tracking Transceiver is comprised of an AN Transceiver and a Software Application; and a plurality of said Remote Transceivers wherein each Remote Transceiver is comprises of a AN transceiver and a Software Application; wherein each Tracking Transceiver broadcasts a unique identification code which identifies itself to a plurality of said Remote Transceivers, receives a plurality of said Remote Transceivers by decoding each identification code that identifies uniquely each Remote Transceiver, and computes the delay for each received identification code received from a Remote Transceiver with respect to the transmission of its unique identification code; wherein said Tracking Transceiver AN transceiver transmits and receives simultaneously through the same antenna; wherein each Remote Transceiver receives a plurality of said Tracking Transceivers by decoding each identification code that identifies uniquely each Tracking Transceiver, transmits a unique identification code to each Tracking Transceiver immediately upon reception of said Tracking Transceiver identification code; wherein the Remote Transceiver AN transceiver transmits and receives through the same antenna;

wherein said Tracking Transceiver Software Application is comprised of a non-transitory computer-usable medium embodying computer program code, the computer program code comprising computer executable instructions to establish identification and location functions in the identification and location system comprises of Tracking Transceivers and Remote Transceivers wherein the instructions are executed by processing logic to display a human machine interface (HMI) associated with a Tracking Transceiver, wherein the HMI displays the identification of each received Remote Transceiver, the delay between the associated Tracking Transceiver and each received Remote Transceiver, the distance between the associated Tracking Transceiver and each received Remote Transceiver; to provide distance-dependent alerts as the distance between the Tracking Transceiver and the Remote Transceiver decreases; to generate a unique ID code for said associated Tracking Transceiver for broadcasting to said Remote Transceivers; to receive the unique ID code of any Remote Transceiver; to generate a one-way transit time computation upon the transmission of said unique ID code for said associated Tracking Transceiver and the timed reception of the unique ID code of a Remote Transceiver to compute the distance to said Remote Transceiver; to send arbitrary messages to modify arbitrary functions or conditions of a Remote Transceiver; to receive messages from a Remote Transceiver, identifying arbitrary conditions or functions; and to color-code each received Remote Transceiver;

wherein said Remote Transceiver Software Application is comprised of a non-transitory computer-usable medium embodying computer program code incorporated in said Remote Transceivers, the computer program code comprising computer executable instructions to establish identification and location functions wherein the instructions are executed by processing logic to transmit a unique identification code to each Tracking Transceiver upon receipt of said Tracking receiver identification code; to send arbitrary messages identifying arbitrary functions or conditions to any tracking Transceiver; and to receive arbitrary messages from a Tracking Transceiver to modify arbitrarily conditions or functions.

6. A method for providing the identification and location of a Transceiver by another Transceiver in a Radiofrequency Identification and Location System operating in a meshed Area Network or MANET architecture comprising the steps of: Starting the system; broadcasting kth Transceiver identification code; receiving the identification code from the kth Transceiver at the ith Transceiver; providing the ID of the ith Transceiver by virtue of its unique identification code; computing and displaying the delay from the time the kth Transceiver transmits its identification code to the reception of the ith Transceiver identification code in the kth Transceiver; computing and displaying the distance between the kth Transceiver and the ith Transceiver based on the one-way transit time; providing distance-dependent alerts for the ith Transceiver at the kth Transceiver; determining whether the ith Transceiver is within reachable distance of the kth Transceiver; locating and retrieving the ith Transceiver if it is within reachable distance; stopping the system for the kth Transceiver and the ith Transceiver pair.

7. A Radiofrequency Identification and Location System for identifying and locating a Transceiver in a mesh network by another Transceiver in said mesh network operating in a MANET architecture, comprising: a plurality of Transceivers in said mesh network wherein the kth selected Transceiver is comprised of a MANET transceiver and a Software Application; wherein the kth Transceiver broadcasts a unique identification code which identifies itself to the other Transceivers in said mesh network, receives the totality of the other Transceivers by decoding each identification code that identifies uniquely an ith Transceiver, and computes the delay for each received identification code received from the ith Transceiver with respect to the transmission of its unique identification code; wherein said kth Transceiver MANET transceiver transmits and receives simultaneously through the same antenna; wherein said ith Transceiver receives said kth Transceiver by decoding the identification code that identifies uniquely said kth Transceiver and transmits a unique identification code to the kth Transceiver immediately upon reception of said kth Transceiver identification code; wherein said ith Transceiver receives a plurality of Transceivers for which a unique identification code is to be transmitted; wherein said ith Transceiver MANET transceiver transmits and receives simultaneously through the same antenna; wherein said kth Transceiver Software Application is comprises of a non-transitory computer-usable medium embodying computer program code, the computer program code comprising computer executable instructions to establish identification and location functions in the identification and location system wherein the instructions are executed by processing logic to display a human machine interface (HMI) associated with the kth Transceiver, wherein the HMI displays the identification of the ith Transceiver, the delay between the kth Transceiver and the received ith Transceiver, the distance between the kth Transceiver and the received ith Transceiver; to provide distance-dependent alerts as the distance between the kth Transceiver and the ith Transceiver decreases; to generate a unique ID code for the kth Transceiver for broadcasting to said ith Transceiver; to receive the unique ID code of the ith Transceiver; to generate a one-way transit time computation upon the trigger of the transmission of said unique ID code of the kth Transceiver and the timed reception of the unique ID code of the ith Transceiver to compute the distance to said ith Transceiver; to send arbitrary messages to modify arbitrary functions or conditions of the ith Transceiver; to receive messages from the ith Transceiver, identifying arbitrary conditions or functions; and to color-code each received ith Transceiver.

8. A Radiofrequency Identification and Location System for identifying and locating a Transceiver in a mesh network by another Transceiver in said mesh network operating in an Area Network (AN) architecture, including Wide Area Network (WAN) and Personal Area Network (PAN) architectures, comprising: a plurality of Transceivers in said mesh networks wherein the kth Transceiver is comprised of a AN transceiver and a Software Application; wherein the kth Transceiver broadcasts a unique identification code which identifies itself to the other Transceivers in said mesh network, receives the totality of the other Transceivers in said mesh network by decoding each identification code that identifies uniquely an ith Transceiver, and computes the delay for each received identification code received from the ith Transceiver with respect to the transmission of its unique identification code; wherein said kth Transceiver AN transceiver transmits and receives simultaneously through the same antenna; wherein the ith Transceiver receives said kth Transceiver by decoding the identification code that identifies uniquely said kth Transceiver and transmits a unique identification code to the kth Transceiver immediately upon reception of said kth Transceiver identification code; wherein the ith Transceiver receives a plurality of Transceivers for which a unique identification code is to be transmitted; wherein the ith Transceiver AN transceiver transmits and receives simultaneously through the same antenna;

wherein said kth Transceiver Software Application is comprised of a non-transitory computer-usable medium embodying computer program code, the computer program code comprising computer executable instructions to establish identification and location functions in the identification and location system wherein the instructions are executed by processing logic to display a human machine interface (HMI) associated with the kth Transceiver, wherein the HMI displays the identification of the ith Transceiver, the delay between the associated kth Transceiver and the received ith Transceiver, the distance between the kth Transceiver and the received ith Transceiver; to provide distance-dependent alerts as the distance between the kth Transceiver and the ith Transceiver decreases; to generate a unique ID code for each kth Transceiver for broadcasting to the ith Transceiver; to receive the unique ID code of the ith Transceiver; to generate a one-way transit time computation upon the trigger of the transmission of said unique ID code of the kth Transceiver and the timed reception of the unique ID code of the ith Transceiver to compute the distance to the ith Transceiver; to send arbitrary messages to modify arbitrary functions or conditions of the ith Transceiver; to receive messages from the ith Transceiver; identifying arbitrary conditions or functions; and to color-code the received ith Transceiver.

\* \* \* \* \*